United States Patent Office 3,343,419
Patented Sept. 26, 1967

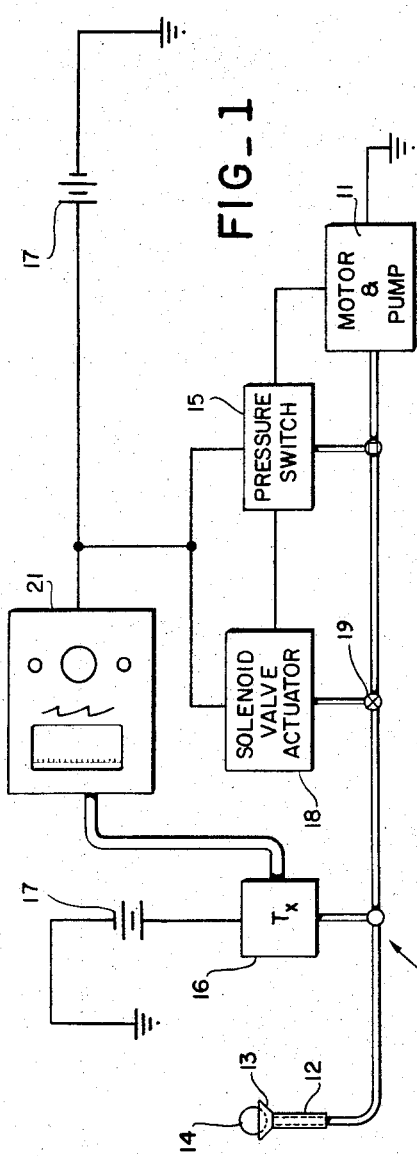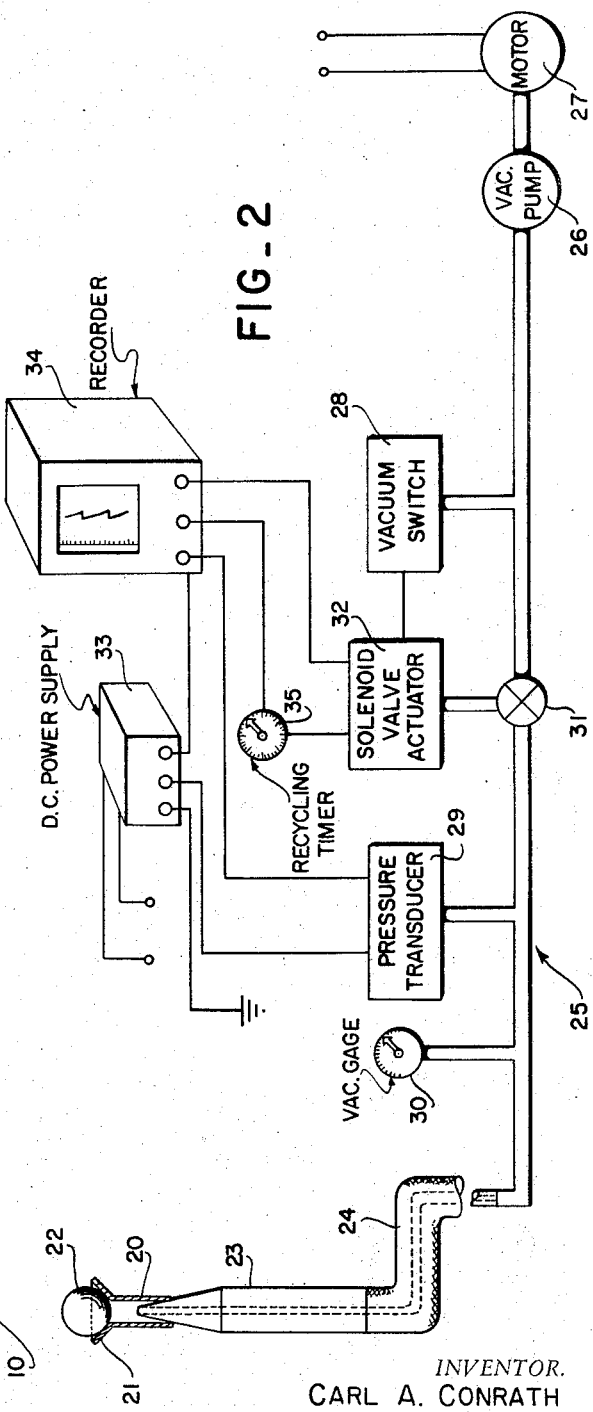

3,343,419
SURFACE ROUND INDICATOR
Carl A. Conrath, Sunnyvale, Calif., assignor to Lockheed Aircraft Corporation, Burbank, Calif.
Filed Dec. 30, 1965, Ser. No. 517,643
4 Claims. (Cl. 73—37.5)

The subject disclosure of invention relates in general to gauging apparatus and in particular to apparatus for determining the "out of round" condition of tube flares or other work pieces having interior round surfaces.

Industry today is making great use of high pressure and high vacuum systems. These systems are comprised of components meeting the strictest tolerance requirements to prevent leakage. For example, a high pressure system may be made of stainless steel or aluminum tubing having flared and tapered fittings which are pressure fitted together by standard AN connectors. To reduce the possibilities of pressure leaks at the joints, it is highly desirable to accurately determine the roundness of the flared end portions of the tubing which are a part of the system. There are presently available devices which will check the roundness of tube flare fittings, but these devices are extremely cumbersome to operate and very expensive. As a result, only sample inspections are made, the final test being made when a system is completed and checked for leakage. The present invention fills an important industry need for a quick, inexpensive inspection means to inspect each flared end when it is completed. It is also possible to determine if the walls of the tube flare are straight as well as round, and will indicate tube flares out-of-round condition to 0.0001 inch or better and will operate on any size tube.

It is accordingly, the primary object of this invention to provide an improved gauging system for accurately determining the out-of-round condition of tube flares.

Another object of the present invention is to provide a gauging system which will determine if the walls of the tube flare are straight as well as round, within the desired angularity or angular tolerance.

These objects and features as well as other objects and features will become apparent to those skilled in the art of gauging upon a careful perusal of the following specification and drawings of which:

FIGURE 1 is a schematic view of a pneumatic system illustrating the present invention.

FIGURE 2 is a diagram of a pneumatic circuit used in the present invention.

Referring now to FIGURE 1 of the drawings, a pneumatic circuit 10 is evacuated by a suitable vacuum pump and motor 11. At the other end of the pneumatic circuit is attached a hollow tube 12 having a flared end portion 13. It is the condition or "roundness" or eccentricity of the inner surface of flared end portion 13 that the present invention is to determine. A stopper, for example a steel ball 14, is positioned so that its surface is seated inside the inner surface of the flared end portion 13 of tube 12. Ball 14 is, for example, a standard industrial steel ball of the type commercially available having approximately a ½ micron accuracy. A differential pressure transducer 16 is connected to circuit 10 and supplied with a convenient electrical power source 17. A solenoid valve actuator 18 is connected to a valve 19 in the pneumatic circuit line. Valve actuator 18 is controlled by a pressure switch 15, also connected into pneumatic circuit 10. Valve actuator 18, pressure switch 15 and motor 11 are all connected to electrical power source 17 by any convenient means.

During operation of the system steel ball 14 is seated within the flared portion of tube 12 and the motor and pump 11 are operated to begin evacuating the system of pneumatic circuit 10. We assume the point of contact between the ball 14 and the inner surface of flare 13 to be close enough to enable pump 11 to draw a vacuum. When pump 11 evacuates down to a convenient level, for example 28 inches of mercury, pressure switch 15, which is preset to initiate operation at that level, responds to actuate solenoid valve 18 to close valve 19 which is normally open. The portion of pneumatic circuit 10 between valve 19 and the tube flare 13 is now isolated and evacuated down to approximately 28 inches of mercury. If the roundness of the flared end portion of tube 12 is true, little if any air will enter into the system, and the electrical output from the pressure transducer 16 will be constant. If this output is connected to a strip chart recorder 21 it is possible to note the fact that no air is entering into the system since the output will be constant and a straight line will be recorded on the chart of recorder 21. If the inner surface of taper 13 is out-of-round, a small amount of air will enter the system and the pressure transducer 16 will immediately sense a change in pressure and transmit a signal to recorder 21 which will reflect the change.

An operating system is shown in detail in FIGURE 2. A length of tubing 20 having at least one flared end portion 21 is to be tested to measure the roundness of the inner surface tube flaring. A steel ball member 22 is seated in the inner surface of the flared end portion 21 of tube 20. A probe 23 of, for example, a soft rubber material having a taper of, for example, ¼" to 1" in diameter is inserted in the other end of tubing 20. The amount of taper of probe 23 is a matter of choice, its function being to permit the same probe to be used on various sized tubes. A flexible line 24 of soft rubber connects probe 23 to an evacuation system 25. Evacuation system 25 is terminated on its other end by a convenient vacuum pump 26 of, for example, the standard laboratory vacuum pump type which is commercially available. Vacuum pump 26 is driven by an electric motor 27 or any other suitable means for operating vacuum pump 26. A vacuum switch 28, pressure transducer 29 and vacuum gauge 30 are all connected into the evacuation system 26 by standard fittings and tubing. Between the pressure transducer 29 and vacuum switch 28 an isolation valve 31 operably connected to a solenoid valve actuator 32 is positioned. The solenoid valve 32 is controlled by vacuum switch 28 through convenient circuitry. The electrical output of pressure transducer 29 is connected to a suitable power source 33 to supply power to pressure transducer 29 and also connected to the input of a suitable strip chart recorder 34, which receives the output signal from pressure transducer 29. Solenoid valve actuator 32 may also be connected to strip chart recorder 34 and to a clocking or timing mechanism 35 which has its output connected to strip chart recorder 34. When it is desirable to check the roundness of the inner surface of the flared end portion of tube 20, probe 23 is inserted in the other end of tube fitting 20 and ball 22 is seated in the end to be tested. Motor 27 is activated which in turn operates vacuum pump 26 to evacuate the system. Valve 31 is in the open position at the initiation of the test cycle. As the system is evacuated and assuming that the roundness condition of the flared end 21 is not too great, the overall system is evacuated down to a desirable pressure, for example 28 inches of mercury. Vacuum gauge 30 is provided only to give a visual indication of the operation as they are generally not accurate enough to give the desired results. When the system is pumped down to 28 inches of mercury, vacuum switch 28, which has been pre-set to operate at that pressure, operates the solenoid valve 32 to close off valve 31. At this time a signal from the solenoid valve will actuate operation of the strip chart recorder 34 and actuate the timer 35. With the valve 31 being closed the system between the valve 31 and the ball 22 is isolated. Assuming the surface roundness of valve flare 21 to be within specifications, little if any air will leak between the ball and flare surface and the pressure transducer will reflect this condition by sending a constant signal to the strip chart recorder 34 and the information recorded thereon will indicate the pressure is constant. After a reasonable time lapse, for example ten seconds, the timer 35 will cut off the solenoid to reopen valve 31 and the test is complete. The ball 22 and probe 23 are removed and inserted in the next item to be tested and the whole cycle begins again.

It is important to note that the present system is not affected by temperature changes since the ball and test item are in relation not affected by expansion or contraction due to temperature changes. Further the entire test operation can be made semiautomatic and the results can be read either in real time or at a later time as the operation so dictates.

It is noted that the exact configurations set forth in the above figures and described above can easily be manipulated while still using the system as taught in the present invention to test the roundness of a surface. It is believed that those skilled in the art of testing or inspection can find many other items which can be tested in this manner, for example the valve seats of valves, etc. It is also noted that if very strict tolerance is required in the degree of roundness of the inner surface of the tube flare, two or more balls of varying diameter may be seated and checked alternately at various positions within the tube flare. For example, a ball of smaller diameter would seat well within the flared portion, near the tube-flare joint. If that checked out, then a larger diameter ball that would seat near the mouth of the flare would be checked, to give a more precise reading.

It is also possible to substitute a tapered plug, made with great precision, for the ball. The operation would be the same, but it is believed that a ball has more versatility and is cheaper. The choice, of course, would be determined by the use and his requirements.

I claim:

1. In a vacuum gauging system for measuring the roundness of a workpiece, the combination comprising a source of negative fluid pressure, air passage means operatively connected to said workpiece, a stopper means having a round outer surface positioned relative to said workpiece so that its round outer surface rests against the surface of said workpiece to be measured, pressure measuring means operatively connected into the system between the source of negative fluid pressure and the workpiece and means for isolating said system between the pressure measuring means and source of negative fluid pressure.

2. The vacuum gauging system according to claim 1 wherein said pressure measuring means includes a pressure transducer having an electrical output means, said pressure transducer having its output means connected to a recorder for making a permanent record of the pressure of the system.

3. The vacuum gauging system according to claim 2 wherein said stopper means includes a ball.

4. The vacuum gauging system according to claim 3 whereby said means for isolating the system includes a valve, a valve actuating means operatively connected to said valve and a pressure switch operatively connected to said system and said valve actuating means, said pressure switch sensing the pressure of said system and actuating said valve actuating means when the system reaches a preset pressure to close the valve means thereby isolating the system from the source of negative fluid pressure.

References Cited
UNITED STATES PATENTS

| | | | |
|---|---|---|---|
| 1,901,966 | 3/1933 | Hoffman et al. | 73—37 |
| 2,357,569 | 9/1944 | Wright et al. | 33—147 |
| 3,015,388 | 1/1962 | Wilckens | 73—45.3 |

LOUIS R. PRINCE, *Primary Examiner.*

W. J. HENRY, *Assistant Examiner.*